United States Patent Office 3,663,492
Patented May 16, 1972

3,663,492
PROCESS FOR THE PREPARATION OF POLYAMIDOCARBOXYLIC ACIDS
Erich Behr, Troisdorf, Germany, assignor to Dynamit Nobel Aktiengesellschaft, Troisdorf, Germany
No Drawing. Filed Jan. 6, 1971, Ser. No. 104,522
Claims priority, application Germany, Jan. 31, 1970, P 20 04 495.5
Int. Cl. C08g 51/02, 51/44, 51/48
U.S. Cl. 260—30.2 R                          10 Claims

ABSTRACT OF THE DISCLOSURE

New and improved process of producing polycarboxy pendant polycarbonamide polymers suitable for cyclization into polyimides by forming a dispersion of each reactant, that is, a tetracarboxylic acid (or a corresponding mono or dianhydride) and a diamine respectively, in an inert substantially non-polar, organic substantially anhydrous liquid; and then adding a polar organic solvent slowly to the dispersion either continuously or intermittently, with stirring and appropriate heat control, whereby said reactants react to form said polycarboxyl pendant polycarbonamide.

---

This invention relates to polyimides and to polyamide prepolymers corresponding thereto. It more particularly refers to a novel method of preparing polycarboxy pendant polyamides.

It is known to prepare polyimides by the polycondensation or aromatic or their corresponding mono or dianhydrides. The polyimides which result from these polycondensations have excellent physical properties in that they are resistant to oxidation and have high thermal stability.

Unfortunately, since these polyimides are infusible and insoluble in most known solvents, their good physical properties are hard to utilize because they are very difficult to work into appropriately shaped articles.

In the past, it has been found possible to convert an appropriate acid or anhydride and diamine by partial condensation into a carboxy pendant polyamide prepolymer. These prepolymers are fusible to some extent and are soluble in some solvents sufficient to be able to solvent case shaped articles, particularly film or sheeting, therefrom. The prepolyamide can then be fully condensed and cyclized into the corresponding polyimide in the form of the desired shaped article, by the action of heat and/or known reagents.

The physical properties of the ultimate polyimide products are determined not only by the chemical nature of the initial reactants but also upon the character of the carboxy pendant prepolyamide polymer. In this regard, difficulties have been encountered in the past because of the art's inability to produce such prepolymers of uniform quality, particularly uniform solution viscosity. When uniformity of physical properties and characteristics was essential, it could only be approached with extreme technical difficulty and at great expense.

Published German patent application (DOS) 1,420,706 has attacked the problem of producing carboxy pendant polyamides suitable for subsequent cyclization into corresponding polyimides by one of three alternative procedures:

(1) Premix the dry solids (diamine and tetracarboxylic acid dianhydride) and combine this solid mixture portion by portion with organic polar solvents under strong agitation.
(2) Dissolve the diamine in the polar solvent and add the dianhydride in solid form.
(3) Proportion the solid diamine and solid anhydride alternately into the solvent.

None of these methods leads to a predeterminable uniform product on a technical scale, since the reaction is very highly exothermic and tends to accelerate, although the reaction mixture ought not to substantially exceed room temperature. Furthermore, the mass must be strongly stirred to homogenize it. In the procedures 2 and 3 cited in DOS 1,420,706, as the transformation progresses the reaction mixture becomes so viscous, even with uneconomically great dilution, that the solid substances finally added are no longer dissolved and hence are unable to participate in the reaction. In procedure 1, however, it is virtually impossible to control the removal of the heat and produce the strong stirring of the mixture in such a manner as to avoid an undesirable temperature increase.

Even varying the reactant proportions has not been found to be effective in trying to solve this problem. Further, it has been found that if even a slight excess of one or the other reactant is used the product produced is thermally less stable than with molar equivalents.

By the processes known hitherto, therefore, it is not feasible to prepare polyamidocarboxylic acid prepolymer solutions of reproducible viscosity, such as is required for the production of cast films.

It is therefore an object of this invention to provide a technique for producing carboxy pendant polyamide prepolymers which avoids the difficulties of the prior art.

Another object of this invention is to provide a novel process of producing polyimide precursor carboxy pendant polycarbonamides.

A further object of this invention is to provide a novel process of producing polyimides.

Other and additional objects of this invention will become apparent from a consideration of this entire specification including the claims hereof.

In accord with and fulfilling these objects, one aspect of this invention resides in reacting together a diamine and a tetracarboxylic acid, or its corresponding anhydride, by bringing a dispersion of the reactants into contact with a suitable solvent for the reactants and permitting the reaction to proceed as the reactants pass from the dispersed to the dissolved state.

This process for the preparation of polyamidcarboxylic acids which have free carboxyl groups and contain the repeating unit:

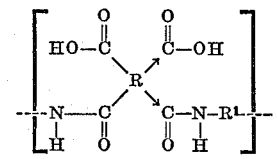

wherein:
→ represents isomerison, R represents a tetravalent, monocyclic or polycyclic aromatic or aliphatic, or araliphatic radical or one containing at least 2 carbon atoms, one carbon atom of the tetravalent radical being linked to no more than 2 carboxyl groups of the dianhydride, and R¹ represents a bivalent radical containing at least two carbon atoms and bearing the two amino groups on separate carbon atoms, comprises the polyaddition of at least one diamine of the general formula

in a substantially equimolar quantity with at least one tetracarboxylic acid dianhydride of the general formula:

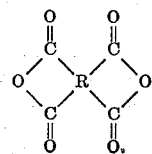

(Wherein R and R¹ have the meanings given above) under substantially anhydrous conditions, at temperatures below 60° C. in an organic, polar solvent whose functional group or groups do not react with the diamine nor with the dianhydride to a greater degree than these components react with one another. The process is particularly characterized by the reactants being utilized in a finely divided form as a dispersion in an inert, non-polar organic anhydrous dispersant and by a polar, organic solvent being fed slowly, continuously or portion by portion, to this dispersion with strong stirring sufficient to accomplish the required removal of heat.

By the application of this process, the prior art difficulties indicated above are avoided. By good and continuous stirring the heat generated by the reaction is easily carried away and the reaction can be uniformly controlled in accordance with the size of the batch. Homogeneous polymers with reproducible physical properites are then obtained.

Even without any shifting of the equivalence of the two reactants, the process of the invention achieves thermally stable products whose reduced viscosity is in the desired range from 0.3 to 5, preferably between 1 and 3. Underpolymerization or overpolymerization is avoided without the use of the usual materials such as clain interrupters and the like known for this purpose, such as phthalic acid anhydride for example.

The polar organic solvents are the aprotonic, anhydrous solvents customarily used in this reaction, such as N,N-dialkylated acid amides of lower, preferably $C_1$ to $C_3$ carboxylic acids, such as dimethylformamide, diethylformamide or dimethylacetamide. However, dimethylsulfoxide, dimethylsulfone, tetramethylenesulfone, pyridine or N-methyl-2-pyrrolidone can also be used.

Suitable dispersants are especially non-polar, organic, anhydrous, liquids, preferably aliphatic and aromatic hydrocarbons, such as benzine fractions, cyclohexane, benzene, toluene, xylene, decaline and tetraline. However, in principle, all organic liquids are suitable for use as dispersants which do not form a charge transfer complex with a tetracarboxylic acid anhydride (see H. S. Kolesnikov et al., Vysokomolekulyarnye Soedineniya 10 (1968) Series A, No. 7, pp. 1511 to 1517).

The quantity of the polar solvent (the reaction medium) is to be between 70 and 99% of the weight of the polyamidocarboxylic acid that forms, i.e., the concentration of the polymer solution that forms should range between 1 and 30 wt. percent, preferably between 5 and 15 wt. percent, of polyamidocarboxylic acid. The quantity depends on the size of the batch, the intensity of the heat removal, the desired viscosity and the quantity of dispersant. The quantity of the dispersant is dependent on the size of the batch to only a limited degree; it is more strongly dependent upon the desired viscosity and on the miscibility thereof with the polymer solution. Assuming that for some applications of the polyamidocarboxylic acid solution, its optimum viscosity should range between 1 and 3, the addition of 5 to 60%, preferably 20 to 40%, of dispersant based on the total volume of the solution proves to be advantageous if the solid content is to amount to about 10% by weight.

The precise determination of the optimum quantity of dispersant depends furthermore on a number of factors, such as the stirring action, the intensity of the heat removal, the concentration of the solution, etc. It therefore has to be determined specifically for each particular set of operating conditions.

The quantity of the dispersant must be such that, after the reaction has ended, it forms a substantially homogeneous solution with the polar solvent. Separation into two phases should not occur. In general, with the customarily known, non-polar dispersants used in the present case, this requirement is met when the proportion of the dispersant is smaller than the proportion of the polar solvent.

It is a decisive feature of the process herein claimed that the organic, non-polar dispersant, which as a rule will be a non-solvent for the polyamidocarboxylic acid that forms, is added prior to the actual reaction, and does not serve as a precipitating agent, i.e., the ratio of the dispersant to aprotonic, polar solvent should not be such that would result in precipitation of the reaction product polyamide polymer, depending on the solid concentration of the polyamidocarboxylic acid.

Another distinctive feature of the process claimed herein, vis-a-vis the state of the art, is that the dispersant is not used in a mixture with the polar solvent, but is added to the solid reactants prior to the reaction, whereupon a dispersion forms, which can be a suspension of a pulpy consistency or a very thin dispersion, depending on the quantity of the dispersant, in which the reactants are finely and uniformly distributed. The aprotonic solvent is then gradually fed to this preliminarily formed dispersion, whereupon the diamine reacts with the anhydride accompanied by the evolution of heat, in a known manner, with the formation of a charge transfer complex. Another feature of the process of the invention is the speed of the reaction, which especially in the case of large batches offers important advantages over the prior-art processes.

These differences, which will be apparent from the comparative examples, are of decisive importance in this field.

The tetracarboxylic acid anhydride used as a reaction component corresponds to the general formula:

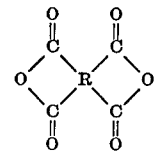

wherein:

R represents a tetravalent radical which is formed of aromatic, aliphatic or cycloaliphatic group or groups— preferably mono or dicyclic. The aromatic radical, as well as the other groupings which take the place of the aromatic radical, can have any desired substituents or constituents; even hetero atoms, such as nitrogen, oxygen or sulfur, provided they are substantially inert with respect to the amine and the anhydride or formed polyamide.

Examples of tetracarboxylic acid anhydrides in which R is an aromatic radical are pyromellitic acid anhydride, 2,3,6,7-naphthalenetetracarboxylic acid dianhydride, 1,2, 5,6-naphthalinetetracarboxylic acid dianhydride, 1,8,9,10-phenanthrenetetracarboxylic acid dianhydride, 2,6- or 2,7-dichloronaphthalenetetracarboxylic acid dianhydride, and 2,2',3,3'-diphenyltetracarboxylic acid dianhydride.

Ethylene tetracarboxylic acid dianhydride is an example of a tetracarboxylic acid anhydride having an aliphatic radical, and examples of a mixed aliphatic aromatic radical are 2,2-bis-(3,4-dicarboxyphenyl)-propane dianhydride and its derivatives containing hetero-atoms, bis-(3,4-dicarboxyphenyl)-ether dianhydride and bis-(3,4-dicarboxyphenyl)-sulfone dianhydride.

Examples of cycloaliphatic dianhydrides are 1,4,5,8-decahydronaphthalenetetracarboxylic acid dianhydride and 1,2,3,4-cyclopentanetetracarboxylic acid dianhydride.

The diamine used as the second reaction component corresponds to the general formula $H_2N-R'-NH_2$, wherein R' represents the bivalent radical of aromatic, aliphatic and/or cycloaliphatic groups which in some cases can also be in combination with one another. The groups can also be substituted and can contain hetero atoms provided these are inert as aforesaid. Aromatic diamines and those diamines in which R' comprises at least 6 carbon atoms, are preferred.

The following are examples of these diamines: m- and p-phenylenediamine, 4,4'-diaminodiphenylmethane, 4,4'-diaminodiphenylpropane, 4,4'-diaminodiphenylsulfone, 4, 4′-diaminodiphenylether, benzidine, m- and p-xylylenediamine, 1,5-diaminonaphthaline, hexamethylenediamine and its higher homologs and their alkyl and alkoxy substitution products, 1,4-diaminocyclohexane or piperazine, and mixtures of these compounds.

The reactants are preferably used in equimolecular amounts if it is desired to obtain a pendant carboxy containing polyamide of high molecular weight. Even an excess of as much as 5 weight percent of one of the two components is permitted while obtaining polymers of appropriately high molecular weight.

The refinement and further processing of the polyimidocarboxylic acid is performed in the customary and often described manner and is not a subject of this invention.

The following examples serve for the further elucidation of the invention on the basis of specific processes. They do not, however, exhaustively describe the invention nor are they limiting, least of all as far as the combinations of substances to be used are concerned.

EXAMPLE 1

4.00 g. (=0.02 mole) of diaminodiphenyl ether was mixed with 4.36 g. (=0.02 mole) of pyromellitic acid dianhydride in the solid state, and 22.5 g. of xylene was added, followed by the drop by drop addition of 52.2 g. of dimethyl formamide with thorough stirring over a period of 10 minutes. The temperature of the reaction mixture was kept between 20 and 22° C. After an additional 20 minutes of stirring the reduced viscosity (0.5% solution in dimethyl formamide) was determined to be 2.6.

EXAMPLE 2

The procedure was precisely the same as in Example 1. A product with a reduced viscosity of 2.8 was obtained. This example proves that the procedure of Example 1 is reproducible.

EXAMPLE 3

The procedure was precisely as in Example 1. A product with a reduced viscosity of 2.6 was obtained. This example proves that the procedure of Example 1 is reproducible.

EXAMPLE 4

The procedure was precisely as in Example 1. A product with a reduced viscosity of 2.9 was obtained. This example proves that the procedure of Example 1 is reproducible.

EXAMPLE 5

The procedure was precisely as in Example 1. A product with a reduced viscosity of 2.7 was obtained. This example proves that the procedure of Example 1 is reproducible.

EXAMPLE 6

(Standard for comparison)

The above-stated quantities of diaminodiphenyl ether and pyromellitic acid anhydride were mixed in the solid state and 75 g. of dimethylformamide was added drop by drop thereto with good stirring. In spite of good stirring and cooling, the temperature could not be held within the above-stated range. A tough, rubber-like mass formed which, upon further dilution, dissolved only with difficulty and incompletely. The reduced viscosity of the dissolved part amounted to 1.2.

EXAMPLE 7

(Standard for comparison)

(a) The above-stated amount of diaminodiphenyl ether was put into 75 g. of dimethylformamide and the above-stated amount of solid pyromellitic acid dianhydride was added portion by portion with good stirring and cooling. Time: about 60 minutes. Viscosity: 3.5

(b) The same procedure was followed as under 7a. A product with a viscosity of 1.8, however, was obtained.

(c) The same procedure was followed as under 7a. A product with a viscosity of 11.2, however, was obtained.

These examples show that reproducible values cannot be obtained by this prior-art procedure.

EXAMPLE 8

75 g. of dimethyl formamide was put into the reaction vessel and the reactants named in Example 1 were added alternately, in the same order, in small, equal portions, with stirring and cooling. Total time: 90 minutes. Viscosity 1.1.

What is claimed is:

1. In the process for the preparation of polyamides having free carboxyl groups pendant therefrom with the recurring mer unit:

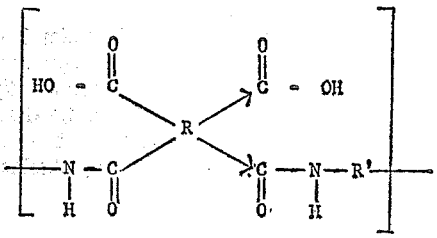

wherein:

→ represents isomerism, R represents a tetravalent, mono- or polycyclic aromatic-cyclo aliphatic or aliphatic radical containing at least two carbon atoms, one carbon atom of the tetravalent radical being linked to no more than two carboxyl groups of the dianhydride, and R′ represents a bivalent radical containing at least two carbon atoms and bearing the two amino groups on different carbon atoms, by the admixture of at least one diamine of the general formula H₂N—R′—NH₂ and at least one tetracarboxylic acid dianhydride of the general formula:

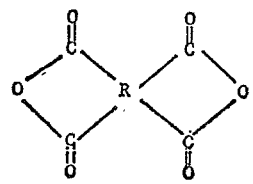

wherein:

R and R′ have the above-stated meanings in substantially equimolar proportions, under substantailly anhydrous conditions at temperatures below about 60° C. in an organic, polar solvent whose functional group is substantially inert with respect to the diamine and the dianhydride to a greater degree than these components react with one another; the improvement which comprises providing said reactants in a finely divided form as a dispersion in a non-polar, organic liquid and then feeding said polar, organic solvent into this dispersion with vigorous stirring and temperature control.

2. The improved process claimed in claim 1, wherein said anhydride is pyromellitic acid dianhydride and said amine is diaminodiphenyl ether.

3. The improved process claimed in claim 1, wherein said polar organic solvent is a member selected from the group consisting of dimethyl formamide, diethylformamide, dimethylacetamide, dimethylsulfoxide, dimethylsulfone, tetramethylenesulfone, pyridine and N-methylpyrrolidone.

4. The improved process claimed in claim 1, wherein said dispersant is a member selected from the group consisting of a benzine fraction, cyclohexane, benzene, toluene, xylene, decaline and tetraline.

5. The improved process claimed in claim 1 wherein said polar solvent is used in proportion of about 70–99 weight percent based upon the weight of polycarbonamide formed.

6. The improved process claimed in claim 1, wherein said dispersant is used in a proportion of about 5 to 60 volume percent based upon the total volume of solution.

7. The improved process claimed in claim 1, wherein said dianhydride is a member selected from the group consisting of pyromellitic acid anhydride, 2,3,6,7-naphthalenetetracarboxylic acid dianhydride, 1,2,5,6-naphthalinetetracarboxylic acid dianhydride, 1,8,9,10-phenanthrenetetracarboxylic acid dianhydride, 2,6- or 2,7-dichloronaphthalenetetracarboxylic acid dianhydride, 2,2',3,3'-diphenyltetracarboxylic acid dianhydride, 2,2-bis-(3,4-dicarboxyphenyl)-propane dianhydride, bis-(3,4-dicarboxyphenyl)-sulfone dianhydride; 1,4,5,8 - decahydronaphthalenetetracarboxylic acid dianhydride and 1,2,3,4-cyclopentanetetracarboxylic acid dianhydride.

8. The improved process claimed in claim 1 wherein said diamine is a member selected from the group consisting of: m- and p-phenylenediamine, 4,4'-diaminodiphenylmethane, 4,4' - diaminodiphenylpropane, 4,4'-diaminodiphenylsulfone, 4,4'-diaminodiphenyl ether, benzidine, m- and p-xylylenediamine, 1,5 - diaminonaphthaline, hexamethylenediamine and its higher homologs and their alkyl and alkoxy substitution products, 1,4-diaminocyclohexane or piperazine, and mixtures of these compounds.

9. The improved process claimed in claim 1, wherein said anhydride is utilized in a proportion of about 95 to 105 parts by weight per 100 parts by weight of diamine.

10. The improved process claimed in claim 2, wherein said solvent is dimethylformamide and said dispersant is xylene.

References Cited

UNITED STATES PATENTS

| 3,546,182 | 12/1970 | Ozumi | 260—78.4 |
| 3,546,152 | 12/1970 | Balton | 260—29.2 |
| 3,563,395 | 2/1971 | Rudlan | 260—47 |

MORRIS LIEBMAN, Primary Examiner

R. ZAITLEN, Assistant Examiner

U.S. Cl. X.R.

260—32.6 N, 33.6 R, 34.2 R, 78 T F